(12) United States Patent
Klindwort et al.

(10) Patent No.: US 12,473,031 B2
(45) Date of Patent: Nov. 18, 2025

(54) BODY OF A PASSENGER CAR

(71) Applicant: Mercedes-Benz Group AG, Stuttgart (DE)

(72) Inventors: Andreas Klindwort, Unterensingen (DE); Gernot Jaeger, Gaertringen (DE); Michael Wirsing, Gechingen (DE); Maxime Dagonet, Wendlingen (DE)

(73) Assignee: Mercedes-Benz Group AG, Stuttgart (DE)

( * ) Notice: Subject to any disclaimer, the term of this patent is extended or adjusted under 35 U.S.C. 154(b) by 388 days.

(21) Appl. No.: 18/041,314

(22) PCT Filed: Jun. 28, 2021

(86) PCT No.: PCT/EP2021/067598
§ 371 (c)(1),
(2) Date: Feb. 10, 2023

(87) PCT Pub. No.: WO2022/033758
PCT Pub. Date: Feb. 17, 2022

(65) Prior Publication Data
US 2023/0294770 A1   Sep. 21, 2023

(30) Foreign Application Priority Data
Aug. 13, 2020   (DE) ............ 10 2020 004 923.0

(51) Int. Cl.
*B62D 25/02* (2006.01)
*B62D 21/15* (2006.01)
(Continued)

(52) U.S. Cl.
CPC ......... *B62D 21/152* (2013.01); *B62D 25/025* (2013.01); *B62D 25/2036* (2013.01); *B62D 27/023* (2013.01)

(58) Field of Classification Search
CPC .. B62D 25/025; B62D 25/20; B62D 25/2027; B62D 25/2036; B62D 27/023; B62D 27/06; B62D 25/08; B62D 21/152
(Continued)

(56) References Cited

U.S. PATENT DOCUMENTS 5,338,080 A * 8/1994 Janotik ............... B62D 29/008
296/205
5,458,393 A * 10/1995 Benedyk ............. B62D 23/005
280/798
(Continued)

FOREIGN PATENT DOCUMENTS

CN   102514631 A   6/2012
CN   105358412 A   2/2016
(Continued)

OTHER PUBLICATIONS

PCT/EP2021/067598, International Search Report dated Oct. 11, 2021 (Two (2) pages).

*Primary Examiner* — Dennis H Pedder
(74) *Attorney, Agent, or Firm* — Crowell & Moring LLP (57) ABSTRACT

A body of a passenger car includes a side sill and a side member in a region of a rear end of the body where the side member is disposed further inward in a transverse direction of the passenger car than the side sill. The side sill has a recess disposed in front of a rear wheel of the passenger car in a longitudinal direction of the passenger car. The side member has a protrusion which projects in the transverse direction of the passenger car. The recess is engaged by the protrusion. A structural foam is disposed in a gap that is disposed in the longitudinal direction of the passenger car between the protrusion and a wall of the side sill which delimits the recess in the longitudinal direction of the
(Continued)

passenger car such that the protrusion is supported on the wall in the longitudinal direction of the passenger car.

5 Claims, 5 Drawing Sheets

(51) Int. Cl.
*B62D 25/08* (2006.01)
*B62D 25/20* (2006.01)
*B62D 27/02* (2006.01)

(58) Field of Classification Search
USPC ..... 296/209, 203.2, 4, 29, 30, 187.09, 1, 12, 296/2, 198, 193.07

See application file for complete search history.

(56) References Cited

U.S. PATENT DOCUMENTS

| | | | |
|---|---|---|---|
| 6,824,204 B2* | 11/2004 | Gabbianelli | B62D 25/2036 296/193.06 |
| 9,611,638 B2* | 4/2017 | Belpaire | B32B 37/142 |

FOREIGN PATENT DOCUMENTS

| | | |
|---|---|---|
| CN | 107406109 A | 11/2017 |
| DE | 10 2014 108 961 A1 | 12/2014 |
| DE | 10 2014 114 638 A1 | 4/2016 |
| DE | 10 2015 100 265 A1 | 7/2016 |
| DE | 10 2015 101 003 B3 | 7/2016 |
| DE | 11 2018 002 641 T5 | 2/2020 |
| DE | 10 2020 003 322 A1 | 7/2020 |
| JP | 5-162661 A | 6/1993 |
| JP | 2005-255067 A | 9/2005 |
| WO | WO 2019/114663 A1 | 6/2019 |

* cited by examiner

BODY OF A PASSENGER CAR

BACKGROUND AND SUMMARY OF THE INVENTION

The invention relates to a body of a passenger car.

Bodies of passenger cars are already sufficiently known from series vehicle construction. They comprise a rear-end region in which a side wall connected to the body in its rear region is provided and at least one side sill. Furthermore, a side member arranged in the region of the rear end, in particular separately from the side wall, is provided. The side member is arranged further inwards in the transverse direction of the vehicle than the side sill. Furthermore, DE 11 2018 002 641 T5 discloses a vehicle body which has side sill load transfer elements which are provided inside respective side sills and contribute to stiffening the sill.

It is the object of the present invention to create a body of the type mentioned above so that a particularly advantageous accident behavior can be realized.

The passenger car body has a side sill and a side member in the region of the rear end of the motor vehicle, the side member being arranged further inwards in the transverse direction of the vehicle than the side sill. The side sill can be partially or completely a component of a side wall of the body forming at least part of the outer skin of the motor vehicle. The side member is preferably a component of a floor of the body, also referred to as a floor assembly, or can alternatively be formed as a separate component. The floor, for example, at least partially delimits the passenger cell of the body, which is also referred to as the interior or passenger compartment, downwardly in the vertical direction of the vehicle. The side member, which is arranged further inwards than the side sill in the transverse direction of the vehicle, covers or overlaps the side sill inwardly in the transverse direction of the vehicle, at least partially.

In order to be able to realize a particularly advantageous accident behavior, it is provided in accordance with the invention that the side sill has a recess which is arranged in front of a rear wheel of the passenger car in the longitudinal direction of the vehicle. The side member here has a protrusion which projects in the transverse direction of the vehicle and which engages in the recess and is consequently also arranged in front of the rear wheel of the passenger car in the longitudinal direction of the vehicle. Because the protrusion engages in the recess and thus in the side sill, the side sill and the side member are form-fittingly connected to each other or else there is a small gap between the side member protrusion and the side sill, which is closed in the event of a collision in the rear-end region of the motor vehicle as a result of a deformation-induced distortion of the body parts, creating a form fit between the side member and the side sill. In a preferred exemplary embodiment, it is provided that this gap between the protrusion and the recess is filled by means of a compensating element, preferably a foam element.

Preferably, it is provided that the side member and the side sill are connected to each other in addition to the form-fit connection by at least one further joining system different from a form-fit joining system, so that it is preferably provided that the side member and the side sill are also connected to each other in an integrally bonded and/or frictionally engaged manner, in addition to the form-fit connection. For example, the side member can also be screwed to the side sill, with the at least one screw connection running in an orientation transverse to the longitudinal direction of the motor vehicle, i.e., the side member is preferably screwed to the side sill from the inside.

The invention is based in particular on the knowledge that, in the event of a frontal impact, in particular with small width overlap, i.e., a so-called "small overlap crash", a high load is applied to at least one joining joint provided in a region arranged in front of the rear wheel in the longitudinal direction of the vehicle, for example the attachment point(s) of a side wall of the motor vehicle to body structure parts, and, in the case of a shell construction of the side sill, its connection points between the side sill shell components. If no appropriate countermeasures are taken, the high load may cause the joining technology to fail, so that as a result a desired structural integrity can no longer be ensured. In the specific case, this can mean, for example, that the side sill shells in the region of their connection flanges, which preferably project upwardly or downwardly from the side sill in the vertical direction of the motor vehicle, peel open so to speak and spread apart as a result of a collision-induced force effect in the direction of the contact surface between the side sill shells. The invention, i.e., the form-fit connection between the side sill and the side member, which is provided in particular in addition to the preferably integrally bonded and/or frictionally engaged joining system, can relieve the joining system so that a particularly advantageous structural integrity of the body can be ensured in the event of a frontal impact, in particular with a small width overlap.

The aforementioned joining system comprises in particular that the side wall is joined to the rear end of the vehicle, in particular the side sill is joined to the side member and/or, in the case of a side sill in shell construction, its sill inner shell and sill outer shell, by at least one or more welding points and/or by at least one or more self-piercing rivets and/or by at least one or more other joining elements, in particular in combination with adhesive bonding. Such a joining system can now be relieved by the invention, so that an advantageous structural integrity and thus an advantageous accident behavior can be realized.

It has proven to be particularly advantageous if a gap is arranged in the longitudinal direction of the vehicle between the protrusion itself and a wall of the side sill which delimits the recess in the longitudinal direction of the vehicle, in particular towards the rear or towards the front. The gap is a tolerance gap which allows an advantageous and in particular simple and thus cost-effective production of the body.

It has proven to be particularly advantageous here if there is arranged in the gap a structural foam, by which the gap is bridged, for example. This means in particular that the structural foam extends, for example, from the protrusion in the longitudinal direction of the vehicle continuously or without interruption to the wall or to a component which may be arranged in the longitudinal direction of the vehicle between the structural foam and the wall, so that the structural foam is arranged on the one hand directly on the protrusion and on the other hand directly on the wall or directly on the component, which is in turn arranged directly on the wall, for example. It is thus conceivable that the gap is bridged by the component and the structural foam. In this case, the structural element is formed separately from the side member and separately from the side sill and separately from the structural foam, for example, and is provided in addition thereto. Thus, the protrusion is supported on the wall in the longitudinal direction of the vehicle via the structural foam, so that a particularly advantageous structural integrity can be ensured, especially in the region in front of the rear wheel. The aforementioned component is preferably a retaining plate to which the structural foam is fastened.

In order to connect the side member to the side sill in a particularly advantageous form-fitting manner, it is provided in a further embodiment of the invention that the protrusion projects outwardly in the transverse direction of the vehicle from longitudinal regions of the side member adjoining the protrusion on both sides in the longitudinal direction of the vehicle.

A further embodiment is distinguished in that the side member and thereby its protrusion are produced by casting.

Further advantages and details of the invention will become apparent from the following description and from the drawings.

DETAILED DESCRIPTION OF THE DRAWINGS

Like parts are provided with like reference signs, and therefore reference is made to the previous description in this regard.

Figure 1:
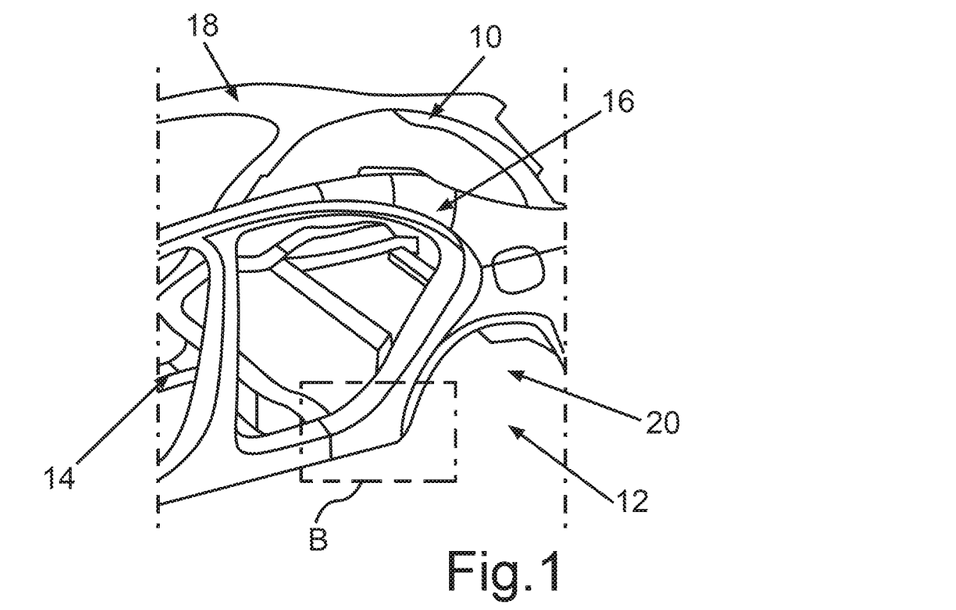
FIG. 1 shows a schematic perspective view of part of a self-supporting body of a passenger car.

FIG. 1 shows a schematic perspective view of part a self-supporting body of a passenger car, simply referred to as a body 10. The body 10 has a rear end 12, also referred to as the rear-end region or vehicle rear-end region, in the region of which a floor assembly 14 of the body 10, also referred to as the floor, is provided.

The body 10 additionally comprises side walls 16 and 18, each forming part of the outer skin of the motor vehicle. When viewed in the forward direction of travel of the passenger car and in the transverse direction of the vehicle, the side wall 16 is the left side wall, while the side wall 18 is the right side wall of the body 10. During the manufacture of the body 10, the floor assembly 14 and the side walls 16 and 18 are first manufactured separately from each other and then joined together. Using the left-hand side wall 16 as an example, it can be seen that the body 10 has rear wheel arches, also known as wheel housings, of which the left-hand rear wheel arch 20 can be seen in FIG. 1. In the fully assembled state of the passenger car, a respective rear wheel of the passenger car is arranged in the respective wheel housing, so that the left-hand rear wheel of the passenger car is at least partially accommodated or arranged in the wheel housing 20.

In FIG. 1, reference sign B designates a region which is arranged in front of the left rear wheel arch 20 in the longitudinal direction of the vehicle and consequently in front of the left rear wheel in the longitudinal direction of the vehicle. In addition, the region B is arranged in the longitudinal direction of the vehicle behind a left front wheel of the passenger car not shown in the figures, so that the region B is arranged in the longitudinal direction of the vehicle between the left front wheel and the left rear wheel of the passenger car.

As will be described in greater detail below and as can be seen from FIGS. 2 to 5, a connection arrangement of the side wall 16 on the rear end 12 of the body 10, in particular on the rear end 12 of the floor assembly 14, is provided in region B. Here, the side wall 16 has a side sill 22 (FIG. 2), and the rear end 12, in particular the floor assembly 14, has a side member 24 which is produced in particular by casting and is thus formed as a cast component. The side member 24 is arranged further inwards in the transverse direction of the vehicle than the side sill 22, in particular in such a way that the side sill 22 is at least partially, in particular at least predominantly or completely, overlapped or covered by the side member 24 in the transverse direction of the vehicle.

In order to be able to ensure a sufficiently high structural integrity of the body 10 even in the event of a frontal impact, in particular with a small width overlap, the side sill 22 has a recess 26, also referred to as a window, in the region B and thus in front of the left rear wheel or in front of the wheel housing 20 in the longitudinal direction of the vehicle. The side member 24 has a protrusion 28, also referred to as a stop, in the region B and thus in front of the wheel housing 20 or in front of the left rear wheel in the longitudinal direction of the vehicle, the protrusion engaging in the recess 26. The side sill 22 and the side member 24 are hereby form-fittingly connected to each other, this form-fitting connection being particularly effective in the event of a crash, i.e., in the event of an impact with a collision partner at the front of the vehicle, which will be discussed in greater detail below.

Figure 3:
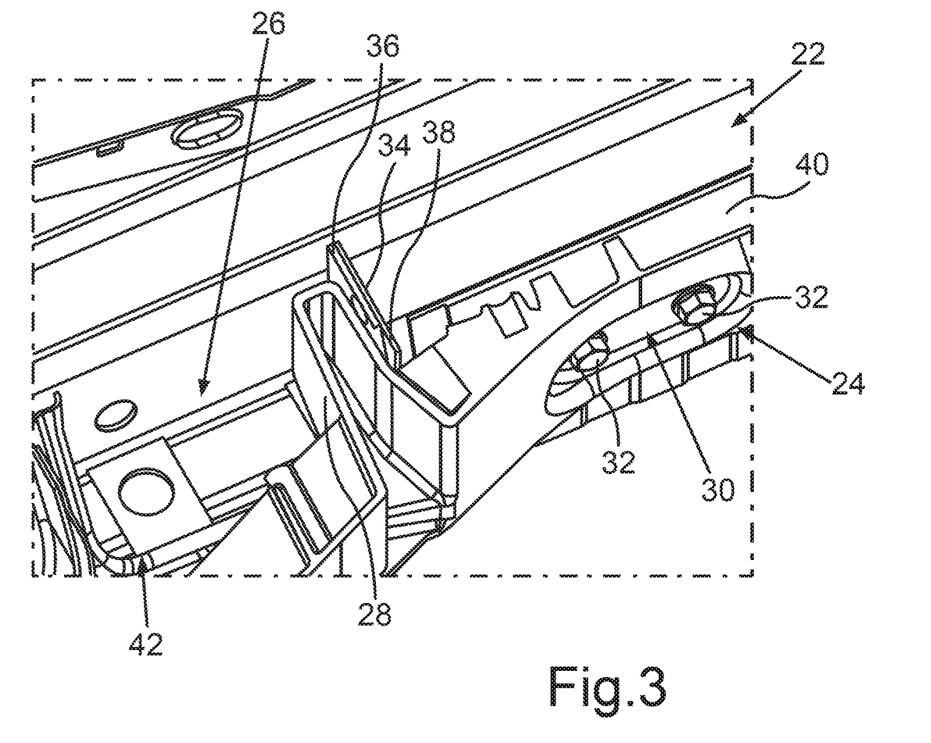
FIG. 3 shows a schematic, cutaway and perspective plan view of part of the connection arrangement.
Figure 6:
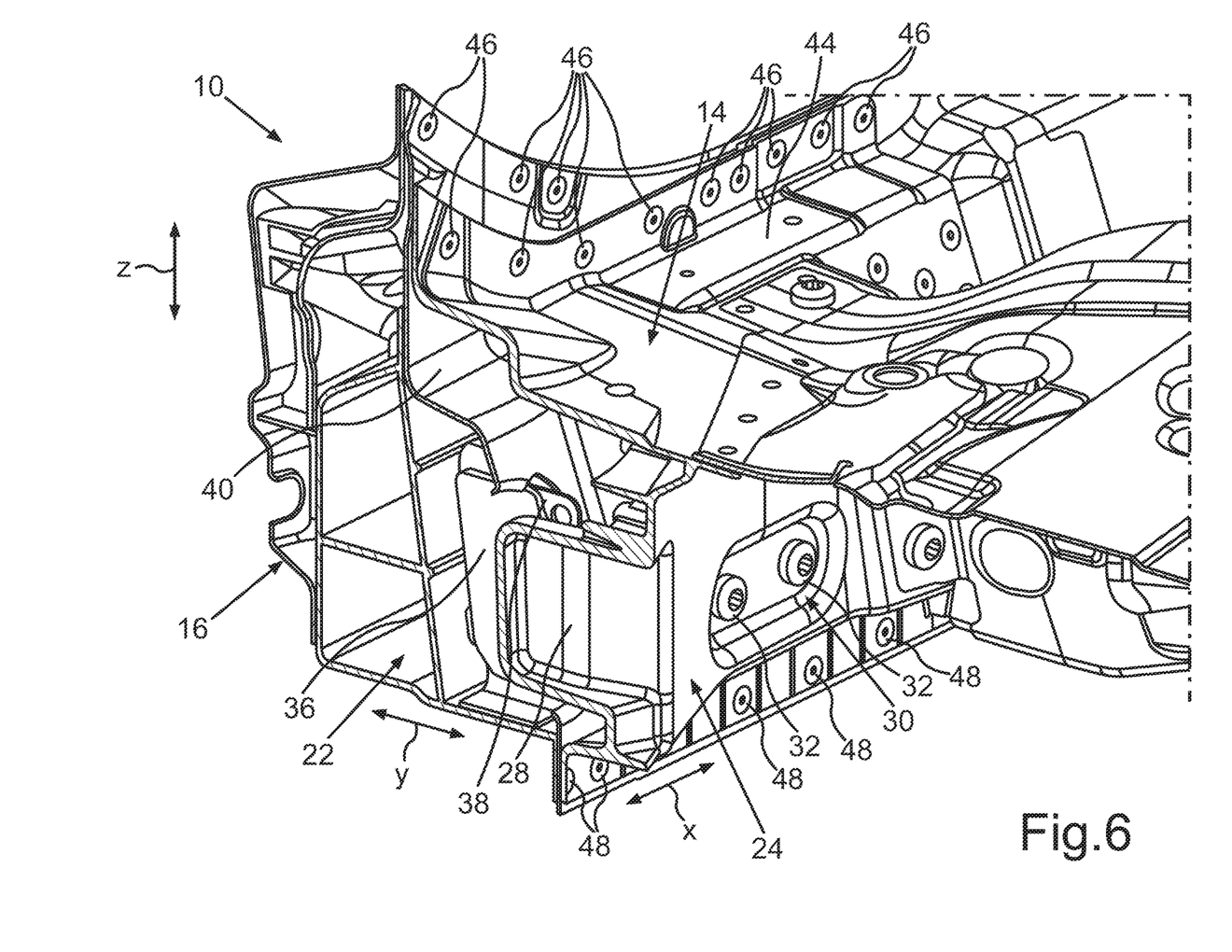
FIG. 6 shows a schematic, cutaway and perspective front view of part of the connection arrangement according to FIGS. 1 to 5.

As can be seen particularly well from FIGS. 3 and 6, the side member 24 is held on the side sill 22 by means of a joining system 30, the joining system 30 in this exemplary embodiment shown in the figures being constituted by screw connections, i.e., the side member 24 is screwed to the side sill 22 and thus connected in a frictionally engaged manner. For this purpose, the joining system 30 comprises several screw elements 32, by means of which the side member 24 is screwed to the side sill 22. The recesses 26 and the protrusion 28 are arranged here in front of the joining system 30 in the longitudinal direction of the vehicle. The form-fitting connection between the side sill 22 and the side member 24 realized by the protrusion 28 and the corresponding recess 26 relieves the load on the joining system 30 in the event of a frontal impact, in particular with a small overlap in width, or an excessive load on the joining system 30 is avoided, so that a particularly high structural integrity of the body 10 and thus a particularly advantageous accident behavior can be provided.

Figure 5:
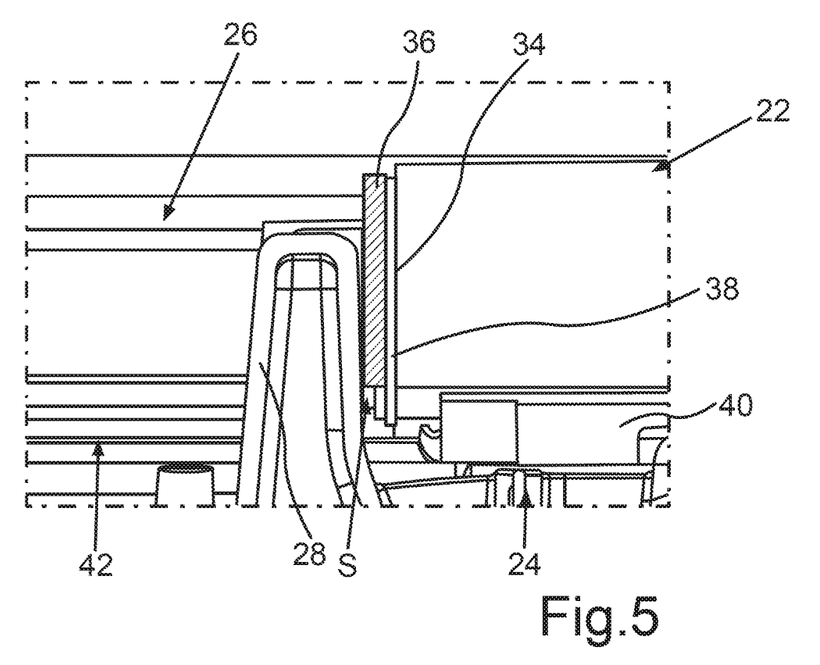
FIG. 5 shows a schematic and cutaway plan view of part of the connection arrangement.

It can be seen particularly well from FIG. 5 that a gap S, also referred to as a tolerance gap, is arranged in the longitudinal direction of the vehicle between the protrusion 28 and a wall 34 of the side sill 22 delimiting the recess 26 in the longitudinal direction of the vehicle. This gap S is provided for manufacturing reasons in order to be able to manufacture the body 10 simply and thus inexpensively. In the completely manufactured state of the passenger car, a structural foam 36 shown hatched in FIG. 5 and a component formed as a retaining plate 38 are arranged in the gap S, the retaining plate 38 being formed separately from the side sill 22 and separately from the side member 24. In addition, the retaining plate 38 is arranged in the longitudinal direction of the vehicle between the structural foam 36 and the wall 34, so that the protrusion 28 is supported in the longitudinal direction of the vehicle via the structural foam 36 and via the retaining plate 38 on the wall 34. The gap S between the protrusion 28 and the wall 34 is bridged, in particular completely, by the structural foam 36 and by the retaining plate 38, so that advantageous structural integrity can be ensured. The structural foam 36 directly contacts the protrusion 28 on the one hand and the retaining plate 38 on the other hand. In particular, the structural foam 36 is fastened to the retaining plate 38.

During the manufacture of the body 10, the retaining plate 38 with the structural foam 36 fastened thereto is arranged in the recess 26, in particular in a state in which the structural foam 36 has not yet expanded. Thus, the retaining plate 38 and the not yet expanded structural foam 36 are initially arranged between the wall 34 and the protrusion 28. Subsequently, a painting process is carried out, by which the body 10 is at least partially painted. This painting process heats the high-strength structural foam 36 fastened on or to the retaining plate 38, causing the structural foam 36 to expand. As a result, the structural foam 36 is applied to the protrusion 28 in a particularly advantageous manner and in particular over a large area, so that the protrusion 28 is supported on the wall 34 in a particularly advantageous manner in the longitudinal direction of the vehicle (x-direction in the vehicle coordinate system) via the structural foam 36. In addition, the tolerance gap is thus advantageously bridged, whereby a particularly high structural integrity can be ensured.

Figure 2:
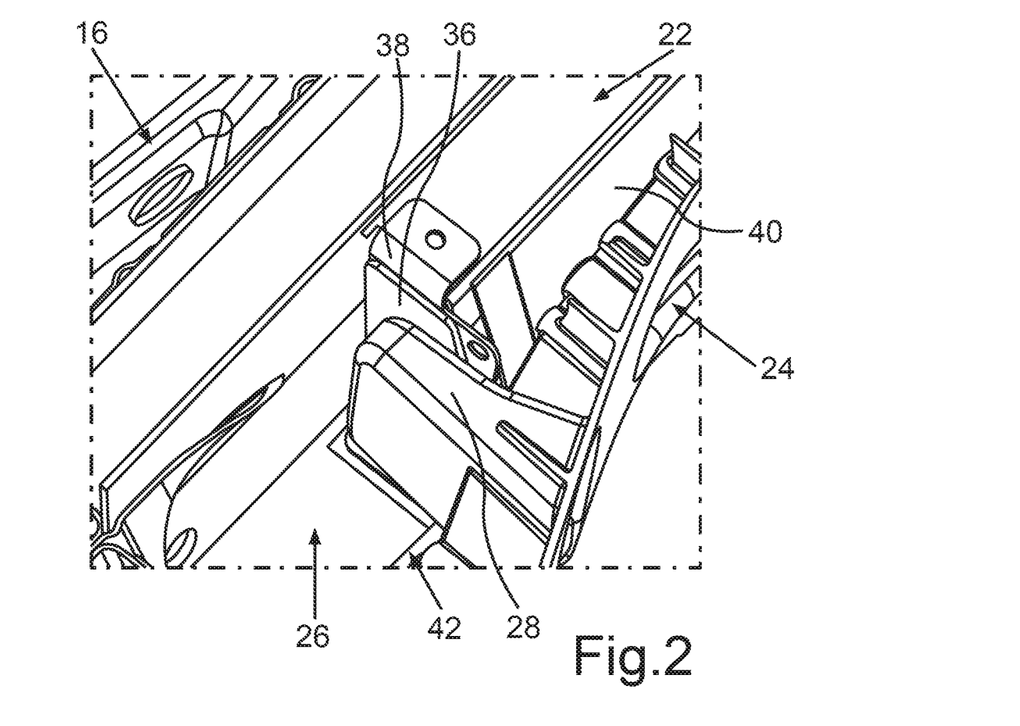
FIG. 2 shows a schematic and perspective plan view of part of a connection arrangement of a side wall on a rear end of the vehicle body.
Figure 4:
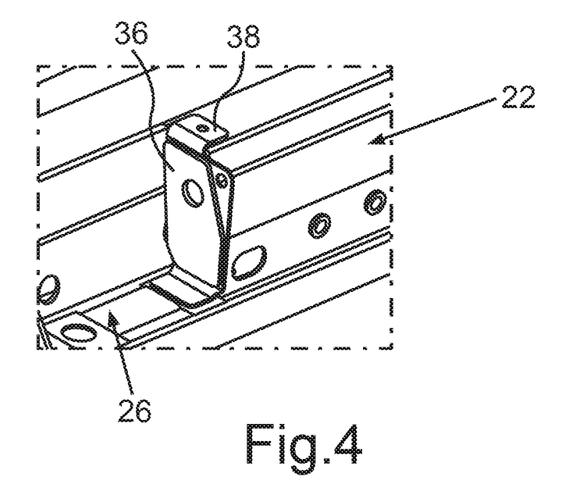
FIG. 4 shows a schematic perspective view of part of the side wall.

It can be seen from the figures that the side wall 16 also has an inner side member 40, which is arranged, for example in the transverse direction of the vehicle, at least partially between the side sill 22 and the side member 24 itself. The side member 24 is a component of the floor assembly 14 here. FIGS. 2 to 4 illustrate the structural foam 36 in its not yet expanded state, in which a small part of the tolerance gap is arranged in the longitudinal direction of the vehicle between the protrusion 28 and the not yet expanded structural foam 36.

The recess 26 creates a support that realizes a form fit between the side sill 22 and the side member 24. The protrusion 28 is formed in the present case as a cast dome which engages in the recess 26. The retaining plate 38 has the particular task here of preventing the structural foam 36 from punching through the side sill 22 in the event of an accident. The side member 40 of the side wall 16, the side member being arranged or located between the side sill 22 and the side member 24 in the present case, also has a further recess 42, referred to as a further window, which is penetrated by the protrusion 28. In other words, the cast dome (protrusion 28) dips through the recess 42 of the side member 40 in order to engage in the recess 26 of the side sill 22, thus realising a form fit between the side member 24 and the side sill 22.

Figure 7:
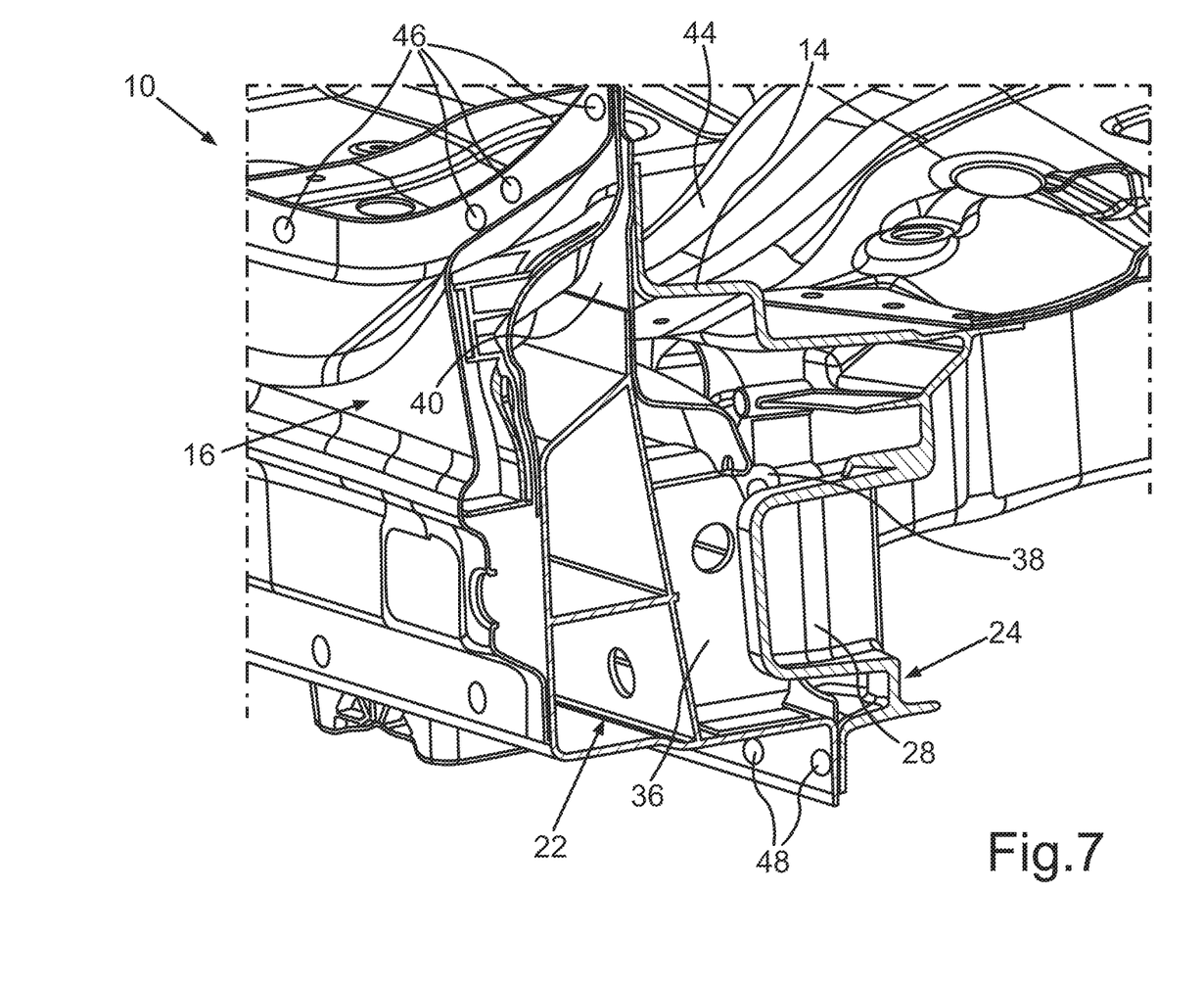
FIG. 7 shows a further front view of the connection arrangement according to FIGS. 1 to 6 from a different angle as compared to FIG. 6.

FIGS. 6 and 7 each show a cutaway perspective view of the body according to FIGS. 1 to 5 from different viewing directions from diagonally in front of the connection arrangement according to the invention. It can be seen that the components abutting against each other in the region of upper connection flanges—as seen in the vertical direction of the vehicle (z-direction in the vehicle coordinate system)—i.e., side wall 16 on side sill 22, side member 40 on side sill 22, as well as a floor element 44 of the floor assembly 14 on the side member 40 are partially connected to each other several times by means of a number of punctiform connection points 46, in particular welding points and/or punch rivets. This means, for example, that the connection points in the region of the fastening flange of the floor element 44 connect it both to the side member 40 and to the side sill 22, and that the connection points connecting the side member 40 to the side sill 22 also include the outer side wall 16, so that this is also fastened to the side sill 22. Furthermore, additional connection points 48 can be seen in the region of the lower connection flanges of the abutting components (side wall 16, side sill 22, side member 40), as seen in the vertical direction of the vehicle (z-direction in the vehicle coordinate system).

The fastening flanges of the aforementioned components lie in a plane spanning in the z-x-direction. The upper fastening flanges are all further outwards in the transverse direction of the vehicle (y-direction) than the lower fastening flanges.

In summary, it should be noted that, due to the form-fit connection between the side member 24 and the side sill 22 according to the invention, not only the joint connections 30 but also the connection points 46, 48 are significantly relieved in the event of a frontal crash, so that the risk of the components peeling open or off along their contact surfaces is at least reduced.

The invention claimed is:

1. A body (10) of a passenger car, comprising:
a side sill (22) and a side member (24) disposed in a region of a rear end of the body (10), wherein the side member (24) is disposed further inward in a transverse direction of the passenger car than the side sill (22);
wherein the side sill (22) has a recess (26) which is disposed in front of a rear wheel of the passenger car in a longitudinal direction of the passenger car, wherein the side member (24) has a protrusion (28) which projects in the transverse direction of the passenger car, and wherein the recess (26) is engaged by the protrusion (28) such that the side sill (22) is form-fittingly connected to the side member (24) in the longitudinal direction of the passenger car or, in an event of a collision in the region of the rear end, a form-fit connection is formed between the side member (24) and the side sill (22); and
a structural foam (36), wherein the structural foam (36) is disposed in a gap(S) that is disposed in the longitudinal direction of the passenger car between the protrusion (28) and a wall (34) of the side sill (22) which delimits the recess (26) in the longitudinal direction of the passenger car such that the protrusion (28) is supported on the wall (34) in the longitudinal direction of the passenger car.

2. The body (10) according to claim 1, further comprising a retaining plate (38), wherein the retaining plate (38) is formed separately from the side member (24) and separately from the side sill (22), wherein the retaining plate (38) is disposed in the longitudinal direction of the passenger car between the structural foam (36) and the wall (34), and wherein the structural foam (36) is fastened to the retaining plate (38).

3. The body (10) according to claim 1, wherein the protrusion (28) projects outwardly in the transverse direction of the passenger car from a first longitudinal region of the side member (24) which adjoins the protrusion (28) and from a second longitudinal region of the side member (24) which adjoins the protrusion (28).

4. The body (10) according to claim 1, wherein the side member (24) is a cast component.

5. The body (10) according to claim 1, further comprising a floor (14), wherein the side member (24) is a component of the floor (14).

\* \* \* \* \*